United States Patent [19]

McFarland et al.

[11] Patent Number: 4,700,502
[45] Date of Patent: Oct. 20, 1987

[54] SEGMENTED TUBULAR FISHING GEAR CONTAINER

[76] Inventors: Ronald F. McFarland, 684 Lone Oak Ave., Eugene, Oreg. 97404; Richard A. Apparcel, 407 Panda Loop, Eugene, Oreg. 97401

[21] Appl. No.: 874,666

[22] Filed: Jun. 16, 1986

[51] Int. Cl.[4] ............................................. A01K 97/00
[52] U.S. Cl. ..................................... 43/21.2; 43/54.1; 43/57.1; 206/315.11
[58] Field of Search .................. 43/21.2, 54.1, 57.1; 248/530, 532, 533; 206/315.11; 224/920, 922, 257; 220/4 R, 4 C

[56] References Cited

U.S. PATENT DOCUMENTS

| | | | |
|---|---|---|---|
| 1,615,229 | 1/1927 | Miller | 43/57.1 |
| 1,772,744 | 8/1930 | Barry | 43/57.1 |
| 2,917,862 | 12/1959 | McCarthy | 43/57.1 |
| 2,970,630 | 2/1961 | Larsen | 248/532 |
| 3,005,671 | 10/1961 | Majeski | 43/54.1 |
| 3,134,264 | 5/1964 | Miller | 220/4 C |
| 3,678,611 | 7/1972 | Files | 43/54.1 |
| 3,858,833 | 1/1975 | Fink | 248/533 |
| 3,962,815 | 6/1976 | Christensen | 43/54.1 |
| 3,987,574 | 10/1976 | Pennino | 43/54.1 |

Primary Examiner—Kurt Rowan
Attorney, Agent, or Firm—James D. Givnan, Jr.

[57] ABSTRACT

A container carried on the person and comprising tubular segments joined in end-to-end fashion by fittings on each segment. End walls serve to close one end of each segment. A pole holder is mounted on a tubular segment and may be detached from the container and thence coupled with a stake assembly for ground insertion. Stacked cylindrical receptacles may be stowed in the tubular segments as may spools of leader with the leaders being threaded through openings in a tubular segment sidewall. A sling permits carrying of the container on the user's shoulder.

3 Claims, 5 Drawing Figures

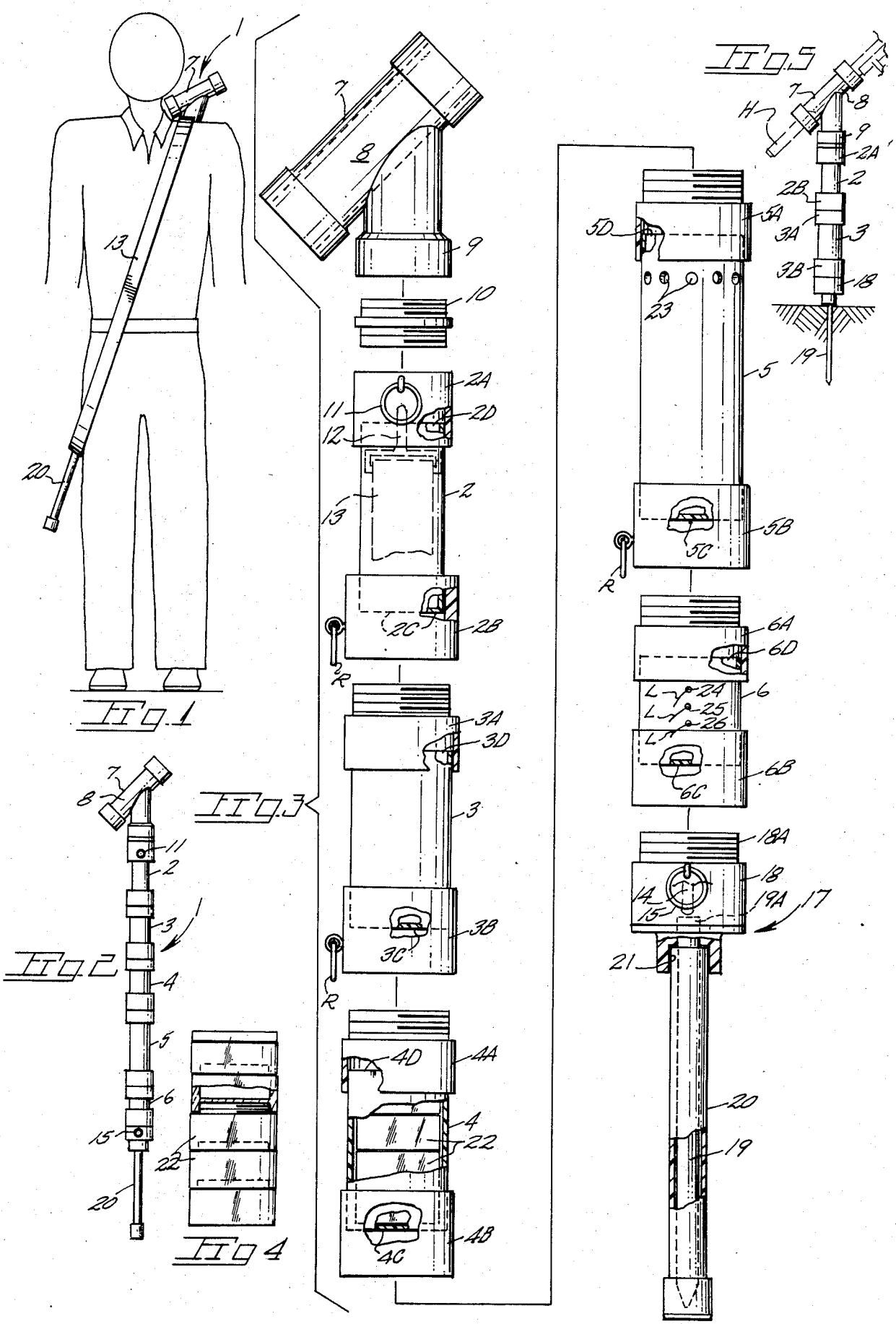

SEGMENTED TUBULAR FISHING GEAR CONTAINER

BACKGROUND OF THE INVENTION

The present invention pertains generally to a tubular structure of a segmented nature having a multitude of readily accessible chambers in which may be carried a variety of small articles such as various items of fishing gear.

Conventional tackle boxes are cumbersome when used by fishermen, who must traverse rugged terrain as in the fishing of rivers, streams and mountain lakes. Additionally, a tackle box cannot be utilized when a river or stream is being fished by wading same. Typically tackle boxes do not keep the many small items of fishing gear separated, but rather permit same to be mixed with one another requiring disentanglement prior to use. Hand carrying of a tackle box further limits the sportsman as to the additional gear that may be needed at a remote fishing site. Additionally, it is not practical to empty and reload a tackle box to suit a certain type of fishing by removal of the box contents and reloading same with the specific tackle needed for the type of fishing to be done.

SUMMARY OF THE PRESENT INVENTION

The present invention is embodied within a tubular storage structure having a multitude of joined segments the contents of which are readily accessible.

The tubular structure is adapted for carrying on the person, by use of a sling, permitting the free use of both hands for other items to be carried. Segments of the structure are joined by coupling means allowing ready access to a segmented interior in which may be stowed a wide variety of fishing gear items. Closures for the segments confine the stowed items against displacement and tangling with the items in an adjacent segment. Provision is made for the stowage of multiple leader spools each having a leader of different test strength with the leaders being threaded through openings in a tubular segment wall for convenient unreeling. Other tubular segments are adapted for carrying live bait as well as small items of tackle such as lures, hooks, weights, swivels, etc., in a manner preventing the mixing of same. The opposite ends of the tubular structure may be equipped with pole holding components including an inclined sleeve and a stake assembly for ground penetration.

Important objectives of the present structure include the provision of a segmented tubular container for fishing gear or the like providing several tubular chambers each of which are readily accessible for access to items stored therein; the provision of a portable tubular storage structure comprised of lightweight, readily available tubing of synthetic material either opaque or transparent and joined by coupling means; the provision of a tubular structure in which may be stowed the many small items of gear used by a sportsman, as for example, the various items of fishing gear used by a fisherman and which structure may be carried on the person by a sling leaving the user's hands free; the provision of a tubular structure which, in addition to serving as a container for miscellaneous small items, may be used as a pole holder during fishing; the provision of a segmented tubular container which may utilize pipe and pipe fittings of a synthetic material providing a low cost, strong container which may be fabricated using solvents or adhesives for the joining of tubular segments and fittings.

BRIEF DESCRIPTION OF THE DRAWINGS

In the accompanying drawing:

FIG. 1 is an elevational view of a user having the present container supported in place by means of a sling;

FIG. 2 is an elevational view of the present container;

FIG. 3 is an exploded view of the present container;

FIG. 4 is an elevational view of a collection of receptacles joined to one another for insertion into a tubular segment; and FIG. 5 is an elevational view of the present container with certain tubular segments removed to serve as a pole holder.

DETAILED DESCRIPTION OF THE PREFERRED EMBODIMENTS

With continuing attention to the drawings wherein applied reference numerals indicate parts similarly hereinafter identified, the reference numeral 1 indicates generally the present container for a variety of small items, such as for example, sports fishing gear. Typically such gear was, in the past, carried within a tackle box or a fishing vest.

The present container is of elongate shape and includes multiple tubular segments as at 2, 3, 4, 5 and 6 with the number and size of such segments being variable, as later explained, to best suit the user's purposes.

For detachable assembly of the tubular segments in end-to-end fashion, the tubular segments are provided with coupling means shown as fittings 2A-2B; 3A-3B; 4A-4B; 5A-5B and 6A-6B. It has been found desirable to provide such coupling means in the form of threaded, male and female pipe fittings. Such fittings, in addition to having threaded portions, have internal smooth wall surfaces which facilitate permanent securement to its tubular segment by an applied adhesive or cement. Use of ABS pipe and pipe fittings has been found satisfactory. Other synthetic pipe material, opaque or transparent, may be utilized if so desired.

Tubular segment 2 supports pole holder means 7 which may be a pipe Y-branch having a sleeve portion 8 through which may be inserted a fishing rod handle H (FIG. 5) for support of a fishing rod in an inclined manner. A threaded connector 10 may be permanently secured to a lower end fitting 9 of Y-branch 7. The lower end of the connector being in removable threaded engagement with tubular segment fitting 2A. Connector 10 may be permanently joined to the Y-branch end fitting 9 and to segment 2.

A ring 11 attached to fitting 2A permits attachment of a snap hook 12 which carries one end of sling means at 13 with the remaining end of the sling attached by a second snap hook 14 to a ring 15 on the lower end of the present container.

The tubular segments are closed at their lower ends by end wall closures at 2C, 3C, 4C, 5C and 6C to confine the items within the tubular segments. Open or upper ends of each segment are at 2D, 3D, 4D, 5D and 6D.

A stake assembly, generally at 17, at the lower end of the container includes a head portion 18 with threads at 18A and in which is mounted the upper end 19A of a stake 19 while a cover or sheath 20 for the stake is frictionally retained within an annular wall surface 21 in the head portion. In use, pole holder means 7 and tubular segments 2 and 3 are unthreaded from segment 4 and stake assembly 17 is removed from tubular segment 6 to permit subsequent attachment of segment 3 to the stake assembly as seen in FIG. 5. Obviously, if a pole holder of greater length is desired, additional tubular segments may be utilized.

In one suitable embodiment of the present container, tubular segment 2 receives a number of cylindrical receptacles 22 of the type shown in FIG. 4 of the type marketed under the trademark Stac Pac, to provide individual containers for hooks, swivels, small lures, sinkers, etc. Similarly, tubular segments 3 and 4 may be similarly equipped with such joined cylindrical receptacles 22.

Live bait may be stored in tubular segment 5 and for this purpose the same may be provided with ventilation openings 23.

Tubular segment 6 includes a cylindrical wall which defines openings at 24, 25 and 26 through which may pass the ends of various leaders at L to provide the fisherman a selection of leaders having different test strengths. Such leader is typically sold on a spool which is of a diameter to be received within tubular segment 6.

Depending on the use to which the present container is put, segments may be removed or added. For example, when stake assembly 17 is not practical, as for example when lake fishing from a boat, the same may be removed and additional tubing segments attached to tubular segments 6 with such segments used for carrying lake fishing gear.

Additional rings at R on the tubular segments permit the attachment of other items of gear by strapping same to the container with a wrapped strap not shown.

As earlier noted, the tubular stock from which the present container is preferably constructed may be of a transparent nature to facilitate the locating of certain items as well as enhancing the appearance of the container. The container may additionally serve in the nature of a walking stick when traversing rough terrain.

While we have shown but one embodiment of the invention, it will be apparent to those skilled in the art that the invention may be embodied still otherwise without departing from the spirit and scope of the invention.

Having thus described the invention, what is desired to be secured in a Letters Patent is:

1. A fishing gear container transportable on the person and comprising in combination, tubular segments in axial alignment with one another, each of said segments having an open end and a closed end and thereby adapted for the reception and storage of items of fishing gear, threaded fittings carried at the ends of said tubular segments permitting coupling of the tubular segments to one another, sling means on the container enabling supporting the container on the person, pole holder means carried by one of said tubular segments, and a stake assembly carried by one of the remaining tubular segments for ground insertion to maintain said pole holder means in place above a ground surface.

2. The fishing gear container claimed in claim 1 wherein one of said tubular segments defines an aperture for the passage of fishing leader.

3. The fishing gear container claimed in claim 1 additionally including receptacles for disposition in a stacked manner within one of said tubular segments.

* * * * *